US006119459A

United States Patent [19]

Gomez et al.

[11] Patent Number: 6,119,459

[45] Date of Patent: Sep. 19, 2000

[54] ELLIPTICAL AXIAL COMBUSTOR SWIRLER

[75] Inventors: Guillermo V. Gomez, Phoenix; Joseph Zelina, Fountain Hills, both of Ariz.

[73] Assignee: AlliedSignal Inc., Morris Township, N.J.

[21] Appl. No.: 09/135,938

[22] Filed: Aug. 18, 1998

[51] Int. Cl.[7] .......... F02C 1/00

[52] U.S. Cl. .......... 60/748

[58] Field of Search .......... 60/748

[56] References Cited

U.S. PATENT DOCUMENTS

| | | | |
|---|---|---|---|
| 4,218,020 | 8/1980 | Reider | 239/406 |
| 5,351,475 | 10/1994 | Ansart et al. | 60/39.36 |
| 5,373,693 | 12/1994 | Zarzalis et al. . | |
| 5,966,937 | 10/1999 | Graves | 60/748 |

*Primary Examiner*—Timothy S. Thorpe
*Assistant Examiner*—Ehud Gartenberg
*Attorney, Agent, or Firm*—Robert Desmond, Esq.

[57] ABSTRACT

A swirling apparatus for directing air into an annular combustion chamber is disclosed comprising a substantially elliptical vane array disposed around a cylindrical fuel injector. The vanes comprising the vane array extend substantially radially from the fuel injector and define first and second air passages therebetween. The first air passages permit an air mass flow through the vane array having a tangential component greater than that of the air mass flow permitted by the second air passages. Each vane has a helical pitch of 60 degrees and comprises a radially outermost edge, a leading edge and a trailing edge. The vane array has major and minor axes of predetermined length with the length of the major axis being greater than the length of the minor axis by a factor of at least 1.3. When used in conjunction with a conventional annular combustion chamber, the minor axis of each of the elliptical vane arrays is aligned radially with respect to the longitudinal axis of the combustion chamber. By aligning the swirlers in this manner, circumferential flow within the combustor is enhanced.

16 Claims, 3 Drawing Sheets

ELLIPTICAL AXIAL COMBUSTOR SWIRLER

The U.S. Government has rights in this invention pursuant to Contract No. NAS3-27752 awarded by the National Aeronautics and Space Administration.

FIELD OF THE INVENTION

The present invention relates generally to gas turbine engine combustors and more particularly to an improved swirling device for directing air into a gas turbine engine for improved combustion efficiency and reduced emissions.

BACKGROUND OF THE INVENTION

Gas turbine engines include a combustion chamber wherein fuel is burned to supply energy that is then extracted by the turbine as mechanical work. To enable combustion, the fuel and compressed air are injected into a combustion zone within the chamber in such a manner as to cause mixing of the air and fuel. Usually the fuel is supplied through one or more fuel nozzles positioned at one end of the combustion chamber. The air is typically supplied by a plurality of air jets proximal the fuel nozzles and distributed along the body of the combustion chamber.

Ideally, the average temperature of the gases exiting the combustion chamber into the turbine is as close to the temperature limit of the material comprising the turbine components as possible. High temperatures are necessary in order to obtain maximum thermal efficiency. Because the fuel enters the combustion chamber and is burned at discrete locations within the combustion chambers, and because of various other practical limitations, it is not possible to achieve an exhaust gas temperature that is completely uniform. Instead, high local temperatures or hot spots in the gas stream will occur. Because the maximum temperature of the gas that reaches the turbine inlet must be below the temperature limit of the turbine components, the average temperature of the gas must be reduced to ensure that the maximum anticipated hot spot will not exceed the turbine temperature limit. Accordingly, the presence of these gas stream temperature anomalies results in a decrease in total gas energy and a corresponding decrease in engine efficiency.

Additionally, it is known that if the fuel-air mixture is not uniformly distributed throughout the chamber, unacceptable levels of CO, NOx and other unwanted gases are formed. In order to reduce objectionable gaseous emissions and improve temperature uniformity, it has been suggested to provide an air swirling device coaxial with each of the fuel nozzles. These swirlers cause the air to flow in a helical (rather than purely axial) direction about the fuel nozzle. Traditional swirler configurations, such as that disclosed in U.S. Pat. No. 5,373,693, establish what may be referred to as a circular flowfield at the swirler exit (as used herein, the term "circular flowfield" refers to a helical flowfields of circular cross-section). In multi-nozzle burners, such as an annular burner, the extent to which a circular flowfield provides optimal flow is inherently geometrically limited, because the circular flowfield provides limited nozzle-to-nozzle mixing. Closer spacing of nozzles improves nozzle-to-nozzle mixing, but only at substantial additional cost.

Accordingly, a need exists for an improved swirler for use in an annular combustor that maximizes nozzle-to-nozzle mixture flow within the combustor while minimizing the number of swirlers and fuel injectors needed for required combustor performance.

SUMMARY OF THE INVENTION

In accordance with the present invention, an improved swirler to be employed by a gas turbine engine combustor is disclosed comprising an elliptically shaped swirler having an array of vanes defining a series of air passages. The swirler configuration is such that air mass flow rates vary from passage to passage. The variations in air mass flow rates produce a helical air flowfield having an elliptical, rather than a purely circular cross section. This elliptical flowfield promotes greater nozzle-to-nozzle flow of air introduced into the combustor. As a of increased nozzle-to-nozzle flow and correspondingly enhanced mixture circulation, fewer fuel injectors and swirlers are needed for optimal combustor performance.

In one embodiment of the invention, a swirling apparatus for directing air into an annular combustion chamber is disclosed comprising a substantially elliptical vane array disposed around a cylindrical fuel injector. The vanes comprising the vane array extend substantially radially from the fuel injector and define first and second air passages therebetween. The first air passages permit an air mass flow through the vane array having a tangential component greater than that of the air mass flow permitted by the second air passages. Each vane has a helical pitch and comprises a radially outermost edge, a leading edge and a trailing edge. The vane array has major and minor axes of predetermined length with the length of the major axis being greater than the length of the minor axis by a factor of at least 1.3. When used in conjunction with a conventional annular combustion chamber, the minor axis of each of the elliptical vane arrays is aligned radially with respect to the longitudinal axis of the combustion chamber. By aligning the swirlers in this manner, circumferential flow within the combustor is enhanced.

DESCRIPTION OF THE PREFERRED EMBODIMENT

Figure 1:
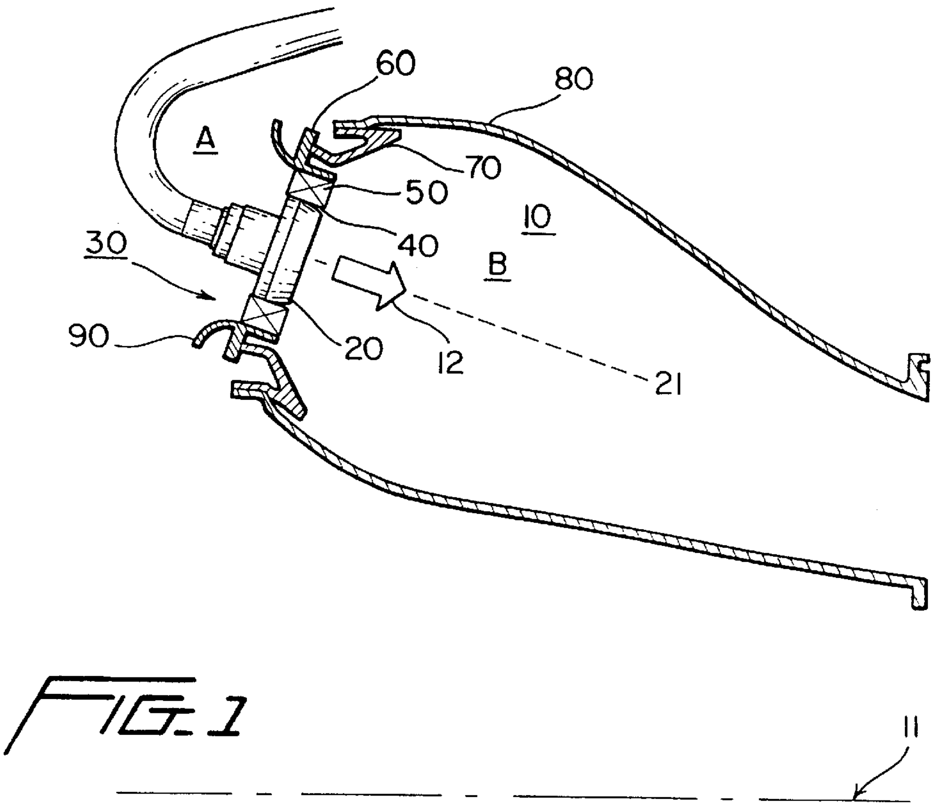
FIG. 1 is an upper half axi-symmetric cross-sectional view of an annular combustion chamber and a swirler incorporating features of the present invention.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 shows in axial cross-section an annular combustion chamber (combustor) 10 disposed within a gas turbine engine about engine longitudinal axis 11. A mixture of air and fuel 12 enters and is burned within the combustor 10. The energy of the resulting exhaust gases is extracted to perform work, such as by rotating a turbine (not shown). The fuel is introduced into the combustor 10 by a pressurized fuel nozzle 20, which defines a longitudinal axis 21. As the fuel 12 exits nozzle 20, it is mixed with air exiting a swirler 30. The resulting mixture is then burned in the combustor 10. The fuel exiting the nozzle may be, gas, pure liquid or may be pre-mixed with air supplied by a source other than swirler 30 prior to mixing with air exiting swirler 30. Swirler 30 imparts a helical swirling motion to the air flowing through it and, accordingly, to the atomized fuel emitted from nozzle 20.

Nozzle 20 is engaged with a substantially cylindrical throat 40, which typically has a longitudinal axis aligned with longitudinal axis 21. Radially outward of throat 40 is vane array 50, comprising a plurality of individual helical vanes as discussed more fully hereinafter. Radially outward of vane array 50 is a wall 90 defining a bell-shaped mouth which serves to direct compressed air through the vane array 50. Swirler 30 further includes a disk-shaped mounting 60 formed from wall 90. Flange 60 functions to secure swirler 30 to combustor dome 70 which is in turn fastened to combustor liner 80.

According to the present invention, swirler 30 receives compressed upstream air flowing in a generally axial direction, that is, in a direction generally parallel to longitudinal axis 21. The configuration of vane array 50 is such that air discharged by swirler 30 flows in a substantially helical direction about longitudinal axis 21. The particular vane configuration of the present invention, however, causes the helical flowfield to have an elliptical, rather than a circular cross section. (A helical flowfield having an elliptical cross section may be referred to hereinafter as an "elliptical" flowfield.)

Figure 2:
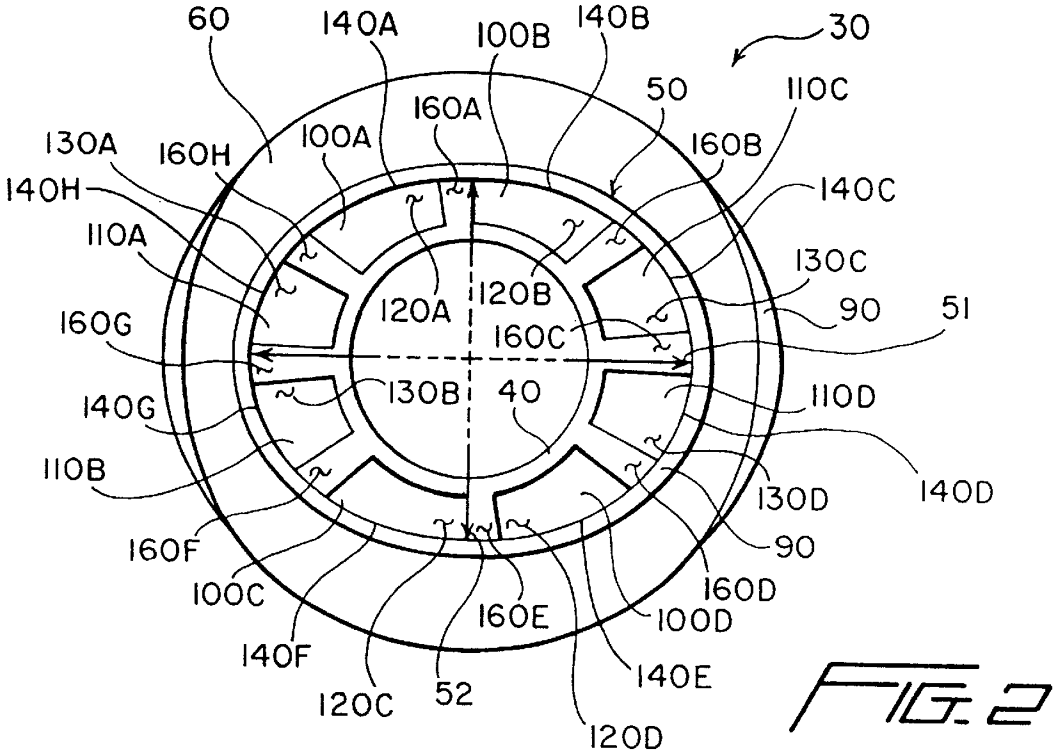
FIG. 2 is a plan view of the downstream portion of a swirler incorporating features of the present invention.
Figure 3:
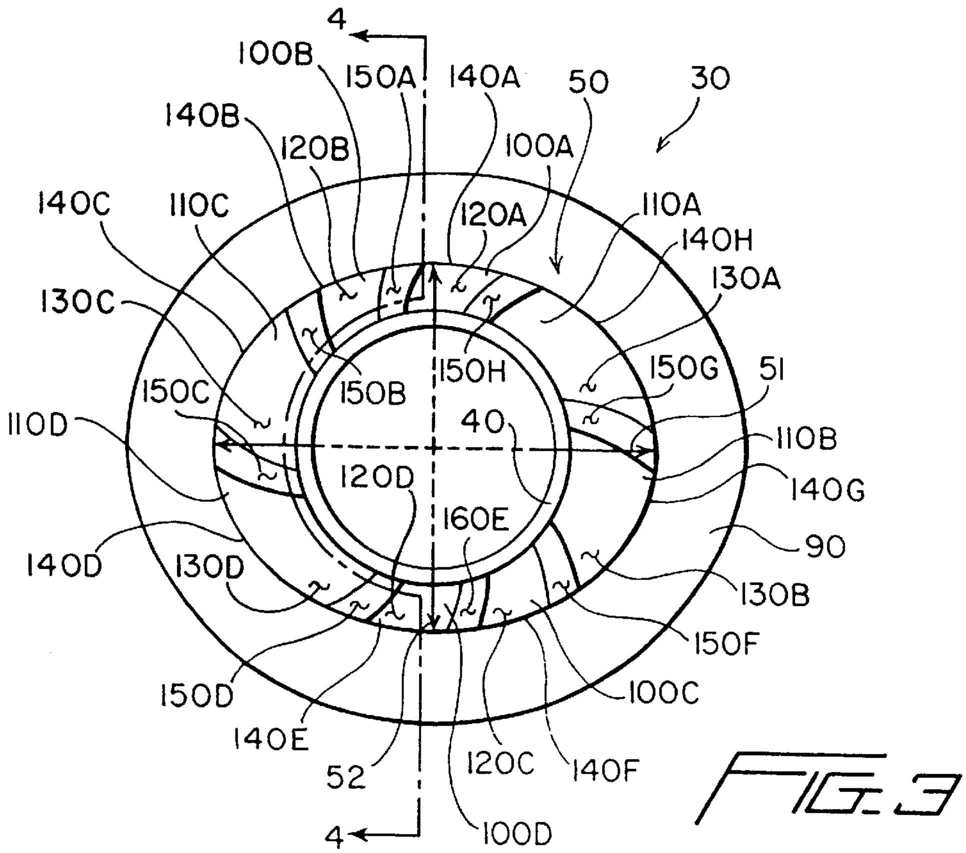
FIG. 3 is a plan view of the upstream portion of a swirler incorporating features of the present invention.
Figure 4:
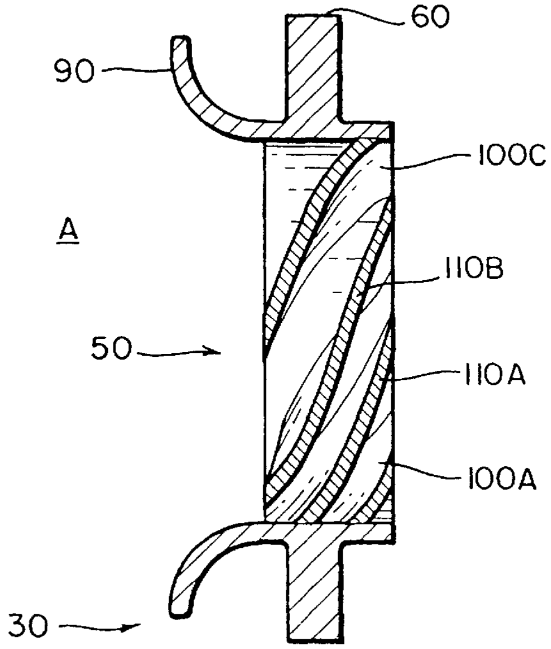
FIG. 4 is a cross-sectional view of a swirler incorporating features of the present invention taken along lines 4—4 of FIG. 3.

FIG. 2 is a plan view of the downstream portion (side B of FIG. 1) of an elliptical swirler incorporating features of the present invention. FIG. 3 is a plan view of the upstream portion (side A of FIG. 1) of an elliptical swirler incorporating features of the present invention. As shown in FIGS. 2, 3 and 4, vane array 50 comprises first vanes 100A, 100B, 100C and 100D and second vanes 110A, 110B, 110C and 110D formed along and extending radially from throat 40. First vanes 100A, 100B, 100C and 100D and second vanes 110A, 110B, 110C and 110D each have a substantially identical fixed helical pitch of between 45 and 75 degrees. Vanes 100A, 100B, 100C and 100D define first air passages 120A, 120B, 120C and 120D and second air passages 130A, 130B, 130C and 130D therebetween. Because of the elliptical configuration, first air passages 120A, 120B, 120C and 120D have larger openings and, therefore, permit an air mass flow rate and velocity that is greater than that permitted by second air passages 130A, 130B, 130C and 130D.

Each vane in vane array 50 comprises radially outermost edges 140A, 140B, 140C, 140D, 140E, 140F, 140G and 140H, each of which is positioned with respect to the other vanes such that vane array 50 is substantially elliptical in shape. Accordingly, vane array 50 has a major axis 51 and minor axis 52. The length of major axis 51 is greater than the length of minor axis 52 by a factor of at least 1.05, preferably at least 1.1 and most preferably by a factor of approximately 1.3.

Figure 5:
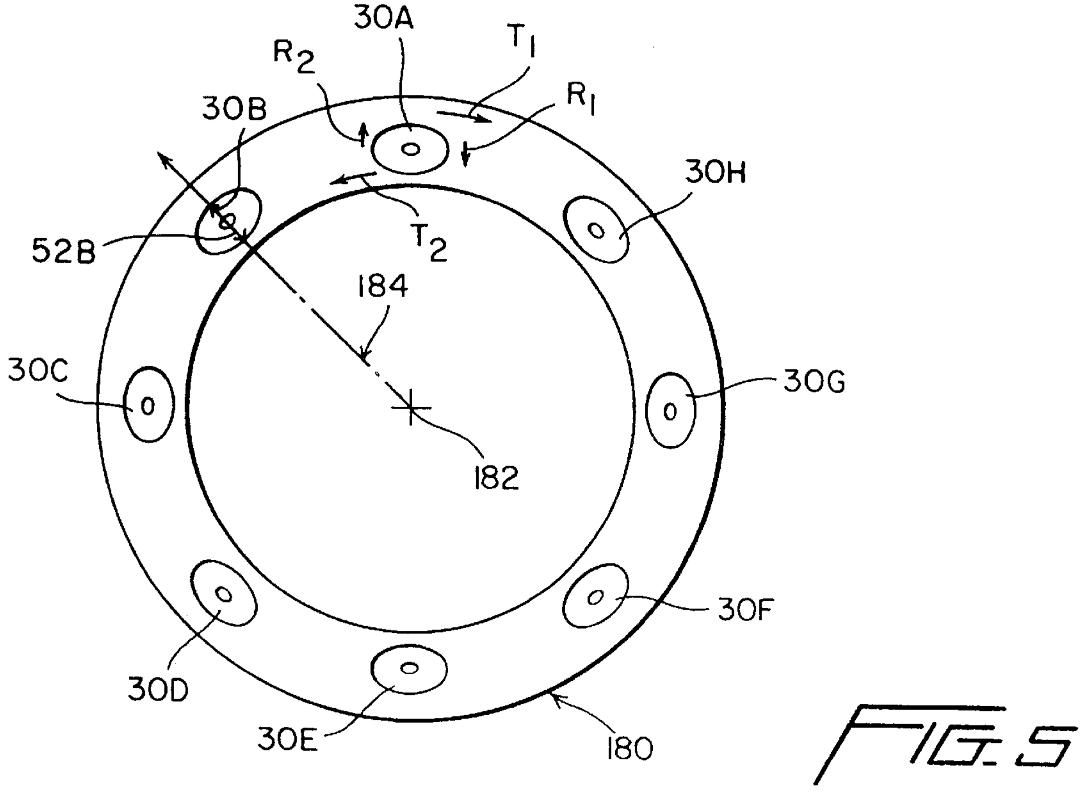
FIG. 5 is a schematic view of an annular combustion chamber having disposed therein a plurality of swirlers incorporating features of the present invention.

FIG. 5 is a schematic representation of an annular combustor 180 having disposed therein a plurality of elliptical swirlers 30A, 30B, 30C, 30D, 30E, 30F, and 30H. As shown with respect to swirler 30B, the minor axis 52B is aligned with a radial line 184 extending from longitudinal axis 182 of combustor 180. The minor axes of the remaining swirlers 30A, 30C, 30D, 30E, 30F, 30G and 30H are similarly radially aligned with respect to longitudinal axis 182. Where the minor axes are radially aligned, major axes of swirlers 30A, 30B, 30C, 30D, 30E, 30F, 30G and 30H are aligned circumferentially with respect to annular combustor axis 182. Although not limiting the invention to a particular theory of operation, it is believed by the inventors of the present invention that with the major axes so aligned, the elliptical flowfield produced by swirlers 30A, 30B, 30C, 30D, 30E, 30F, 30G and 30H produce a greater tangential flow (represented by arrows T1 and T2) relative to longitudinal axis 182 of combustor 180 than would a corresponding number of circular swirlers of the same capacity. Similarly, the elliptical swirlers 30A, 30B, 30C, 30D, 30E, 30F, 30G and 30H produce a smaller radial flow (represented by arrows R1 and R2) relative to axis 182 of combustor 180 than would a corresponding number of circular swirlers. It is believed by the inventors of the present invention that the greater tangential flow promotes better tangential mixing for a given number of injector/swirler combinations and, therefore, lower thermal variations and lower NOx emissions.

As shown in FIG. 3, each vane in vane array 50 further comprises leading edges 150A, 150B, 150C, 150D, 150E, 150F, 150G and 150H and trailing edges 160A, 160B, 160C, 160D, 160E, 160F, 160G and 160H. Each of leading edges 150A, 150B, 150C, 150D, 150E, 150F, 150G and 150H and trailing edges 160A, 160B, 160C, 160D, 160E, 160F, 160G and 160H comprise a substantially flat surface lying in a plane substantially perpendicular to throat longitudinal axis 21.

Although in the illustrative embodiment the desired increase in tangential mixing is accomplished through use of an elliptically shaped swirler, other methods of achieving an elliptical swirler flowfield, such as varying other characteristics (i.e., length, width, coefficient of friction) of first vanes 100A, 100B, 100C and 100D and second vanes 110A, 110B, 110C and 110D, may be employed within the scope of the present invention, provided the appropriate elliptical flowfield is obtained.

Figure 6:
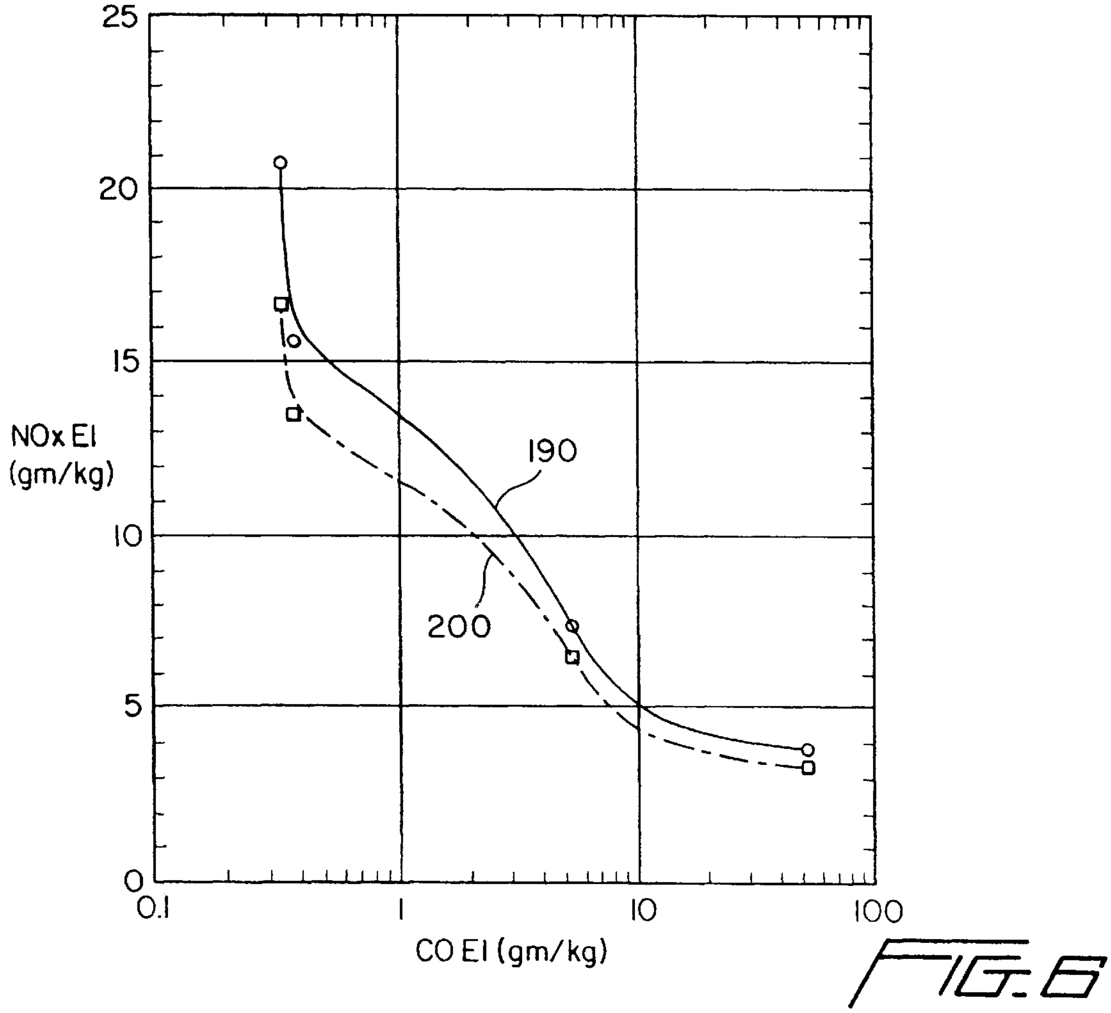
FIG. 6 is a plot of NOx production as a function of CO production comparing the performances of a prior art circular combustor swirler and a swirler incorporating features of the present invention.

FIG. 6 is a plot of NOx production as a function of CO production comprising data collected during tests conducted by the inventors of the present invention. The plot compares the performances of a gas turbine combustor rig utilizing a circular combustor swirler (represented by line 190) and the same gas turbine combustor rig utilizing an elliptical swirler incorporating features of the present invention (represented by dashed line 200). The plot demonstrates that NOx levels increase as the engine approaches its maximum power level, and CO levels increase as the engine approaches its minimum power level. The plot further demonstrates that for any given engine power level, NOx and CO levels are lower when the elliptical swirler is utilized than when the circular swirler is utilized.

Although the invention has been described in terms of the illustrative embodiment, it will be appreciated by those skilled in the art that various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. An apparatus for directing air into a gas turbine engine combustion chamber, said combustion chamber having a longitudinal axis and at least one fuel injector, the apparatus comprising: a vane array disposed about a swirler axis, said vane array comprising a plurality of vanes extending radially outward from said swirler axis defining a plurality of air passages therebetween, said vanes cooperating to provide an elliptical flowfield about said swirler axis, wherein said vane array is elliptical.

2. A swirling apparatus in accordance with claim 1, comprising: an outer wall attached to said chamber.

3. A swirling apparatus in accordance with claim 1, wherein: said combustion chamber is annular in cross section, said annular cross section defining a combustion chamber longitudinal axis.

4. A swirling apparatus in accordance with claim 1, wherein: said elliptical flowfield comprises a major axis and a minor axis.

5. A swirling apparatus in accordance with claim 1, comprising: an inner wall adapted to receive a fuel injector substantially coincident with said swirler axis.

6. A swirling apparatus in accordance with claim 1, wherein: said vanes are helical.

7. A swirling apparatus in accordance with claim 3, wherein: said vane array has major and minor axes of predetermined length, said major axis length being greater than said minor axis length by a factor of at least 1.1.

8. A swirling apparatus in accordance with claim 7, wherein: said minor axis is radially aligned with respect to said chamber longitudinal axis.

9. A swirling apparatus in accordance with claim 3, wherein: said vane array has major and minor axes of predetermined length, said major axis length being greater than said minor axis length by a factor of 1.3.

10. A swirling apparatus in accordance with claim 9, wherein: said minor axis is radially aligned with respect to said chamber longitudinal axis.

11. A swirling apparatus in accordance with claim 1, wherein: said air passages comprise first and second air passages, said first air passage permitting an air mass flow rate through said vane array greater than is permitted by said second air passage.

12. An apparatus for directing air into a gas turbine engine combustion chamber comprising:

a first wall defining a throat, said throat adapted to receive a fuel injector and defining a first longitudinal axis;

a vane array comprising first and second swirler vanes disposed about said throat, said first and second vanes extending radially outward from said throat and defining first and second air passages therebetween, said first air passage permitting an air mass flow rate having a tangential component greater than that permitted by said second air passage, each of said first and second vanes having a helical pitch and comprising a radially outermost edge, a leading edge and a trailing edge, said outermost edges being positioned with respect to one another such that said vane array is substantially elliptical in shape, said vane array comprising major and minor axes of predetermined length, said minor axis being substantially radially aligned relative to a longitudinal axis of said turbine engine combustion chamber, the length of said major axis being greater than the length of said minor axis by a factor of at least 1.1;

substantially elliptical wall having a bell mouth, said wall formed along and contacting each of said outermost edges of said first and second vanes; and a flange formed from said bell member, said flange configured to attach to said combustion chamber.

13. A method of injecting an air-fuel mixture into a gas turbine engine combustion chamber comprising the steps of: injecting a stream of fuel from a nozzle into said combustion chamber, said nozzle defining a first longitudinal axis; providing a flow of air having first and second portions, said first portion of said flow of air having a first mass flow rate and said second portion of said flow of air having a second mass flow of air; injecting said first portion of said flow of air through a first swirler air passage, said first swirler passage causing said first portion of said flow of air to flow in a direction such that said first mass flow rate has a first axial, a first radial, and a first tangential mass flow component with respect to said first longitudinal axis; injecting said second portion of said flow of air through a second swirler air passage, said second swirler air passage causing said second portion of said flow of air to flow in a direction such that said second mass flow rate has a second axial, a second radial, and a second tangential mass flow component with respect to said first longitudinal axis, said first and second air passages being configured such that said first tangential component of said first mass flow rate is greater than said second tangential component of said second mass flow rate, wherein said first and second swirler air passages are defined by a vane array, said vane array comprising first and second swirler vanes, each said first and second vanes comprising a radially outermost edge, said outermost edges being positioned with respect to one another such that said vane array is substantially elliptical in shape.

14. A method in accordance with claim 13 wherein said first mass flow rate is greater than said second mass flow rate.

15. A method in accordance with claim 14 wherein each said first and second vanes have a helical pitch of at least 45 degrees but not more than 75 degrees in magnitude.

16. A method in accordance with claim 14 wherein said vane array comprises major and minor axes of predetermined length, the length of said major axis being greater than the length of said minor axis by a factor of at least 1.1.

* * * * *